Nov. 18, 1924.
J. F. O'CONNOR
1,515,875
FRICTION SHOCK ABSORBING MECHANISM
Filed Dec. 10, 1921
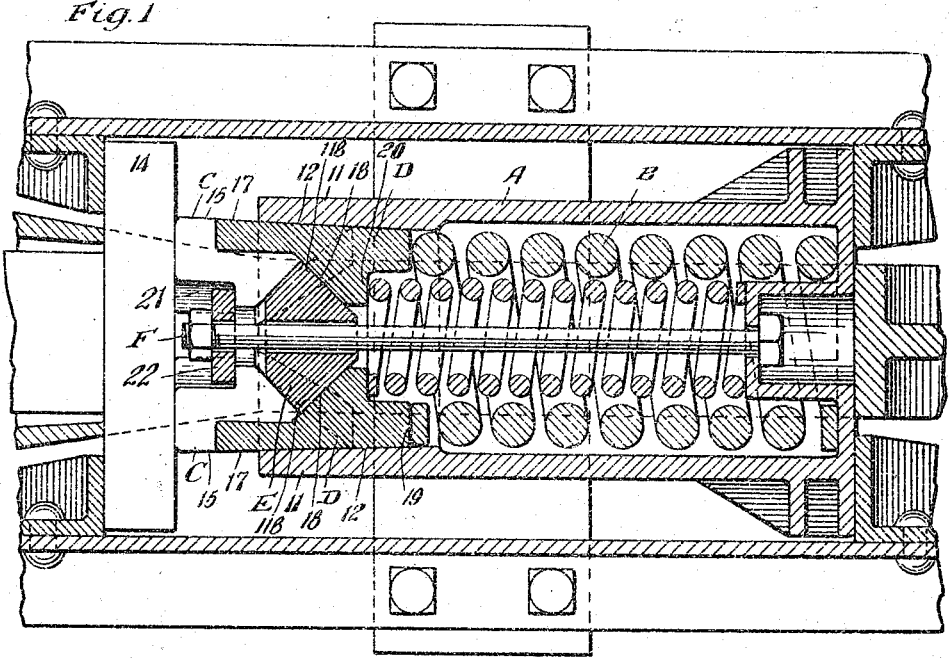
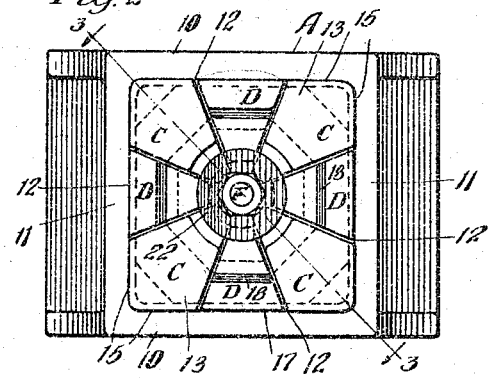
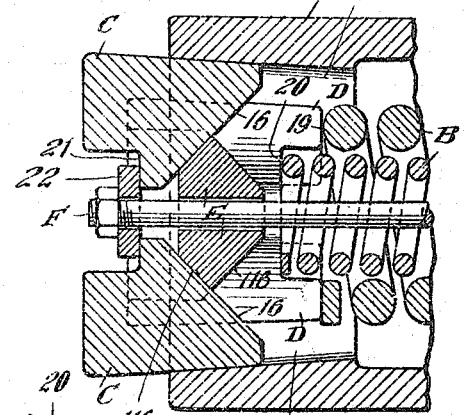
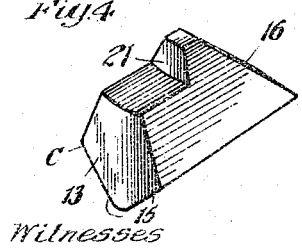
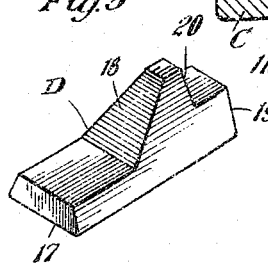
Witnesses
Wm. Geiger
Inventor
John F. O'Connor
By Geo. I. Haight.
His Atty.

Patented Nov. 18, 1924.

1,515,875

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 10, 1921. Serial No. 521,299.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a simple, relatively inexpensive, high capacity friction shock absorbing mechanism especially adapted for railway draft riggings.

In the drawing forming a part of this specification, Figure 1 is a horizontal, longitudinal, sectional view of a portion of a railway draft rigging showing my improvements in connection therewith. Figure 2 is an end elevational view of the shock absorbing mechanism proper. Figure 3 is a longitudinal, sectional view corresponding to the diagonal section plane 3—3 of Figure 2. And Figures 4 and 5 are detail perspectives of two of the wedge-friction shoes employed in my construction.

In said drawing, the shock absorbing mechanism proper is shown as mounted between the draft sills having the usual front and rear stop lugs of a car underframe. The shock absorbing mechanism is connected with a drawbar in the usual manner by a cast yoke and the parts sustained by suitable means such as the detachable saddle plate shown.

The shock absorbing mechanism proper, as shown, comprises a combined friction shell and spring cage casting A; a spring resistance B; a series of outer wedge-friction shoes C—C; a series of inner wedge-friction shoes D—D; a wedge E; and a retainer bolt F.

The casting A, as shown, is of rectangular form having top and bottom walls 10—10 and side walls 11—11. At the front or outer end of the casting, the interior thereof is provided with four friction surfaces on the inner faces of the walls 10 and 11, said surfaces being indicated at 12—12 and converging appreciably inwardly of the shell. Inwardly of the friction surfaces, the casting A provides a cage or casing for the spring and the rear end of the casting is laterally extended so as to cooperate in the manner of a rear follower with the usual rear stop lugs.

Two series of friction shoes are employed, the same being oppositely arranged. The outer series of shoes C—C are four in number and the same are disposed diagonally of the friction shell, that is, each shoe C is located in a corner of the shell as clearly indicated in Figures 2 and 3. Each of said shoes C is formed on the outer end with a flat bearing face 13 adapted to be engaged by the front follower 14. On its outer side, each shoe C is provided with a pair of longitudinally extending friction surfaces 15—15 at right angles to each other and sloped to correspond with the taper of the surfaces of the friction shell. As will be clear, the two surfaces 15—15 engage with two of the shell friction surfaces at right angles to each other. Each shoe C is further provided with a wedge face 16, said wedge faces 16 diverging inwardly of the shell and symmetrically arranged with respect to the axis of the shell.

Each of the shoes D is provided on the outer side thereof with a flat friction surface 17 which cooperates with the middle section of one of the friction surfaces of the shell. On its inner side, each shoe D is provided intermediate its ends with a wedge face 18, said wedge faces 18 diverging outwardly of the shell as best indicated in Figure 1. As shown in Figure 1, the wedge faces 18 of the one series of shoes extend past the wedge faces 16 of the other series of shoes and because of the fact that the shoes D are alternated with respect to the shoes C, the over-all length from the front ends of the shoes C to the rear or inner ends of the shoes D is comparatively small and the length of the friction shell section proper of the casting A correspondingly short.

The wedge E is provided on the outer end thereof with four wedge faces 116—116 which diverge inwardly of the shell and are arranged on the four diagonals thereof to cooperate with the wedge faces 16 of the shoes C. On its inner end, the wedge E is provided with four outwardly diverging wedge faces 118 opposite the centers of the four walls of the shell and cooperable with the wedge faces 18 of the four shoes D. In this manner the wedge E is confined within the two sets of wedge shoes C and D.

The shoes D are cut away at their inner ends so as to provide main shoulders 19 and secondary shoulders 20 forming bearings for the front ends of the outer and inner coils respectively of the main spring resistance B. The shoes C are suitably recessed at their inner ends so as to provide shoulders 21 for a washer 22 through which the retainer bolt F is extended and by means of which it is anchored to the shoes C, the bolt being anchored at its other end to the casting A, as clearly shown in Figure 1.

During compression, it is evident that the load will be transmitted through the wedge shoes C and the latter thereby forced inwardly of the shell. As said shoes C travel inwardly of the shell lengthwise thereof, they are also forced laterally inwardly on account of the tapered formation of the shell. This accelerates the wedge E with respect to the shoes C and the pressure is transmitted through the wedge E to the shoes D. The latter, in being forced lengthwise of the shell by the wedge E are also induced to travel laterally inwardly toward the axis of the shell on account of the tapered formation thereof so that the shoes D are accelerated with respect to the wedge E, thus creating high frictional resistance and at the same time affording an easy release due to the tapered formation of the shell and the comparatively blunt angles which may be employed between the wedge E and the various shoes. It will also be noted that, by arranging one series of shoes in the four corners of the shell and the other shoes intermediate the corner shoes, I utilize substantially the entire area of the friction surfaces of the shell without unduly enlarging the space required to accommodate the friction elements within the shell. All of the shoes and the wedge may be manufactured at comparatively small expense, inasmuch as they are provided with flat surfaces on their active faces which make them readily adaptable to a finishing operation.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having interior friction surfaces; of a spring resistance; an outer series of pressure-transmitting friction shoes having inwardly diverging wedge faces; an inner series of friction shoes having outwardly diverging wedge faces, the wedge faces of all of said shoes being so disposed that they are intersected by a single transverse plane when the parts are in fully released position; and a wedge having both inwardly diverging and outwardly diverging wedge faces having their inner and outer ends, respectively, intersecting in a common plane interposed between and cooperable with said outer and inner series of friction shoes.

2. In a friction shock absorbing mechanism, the combination with a friction shell having interior friction surfaces; of a spring resistance; an outer series of pressure-transmitting friction shoes having inwardly diverging wedge faces; an inner series of friction shoes having outwardly diverging wedge faces; and a wedge having both inwardly diverging and outwardly diverging meeting wedge faces intersecting in a common plane, said wedge being interposed between and cooperable with said outer and inner series of friction shoes, the wedge faces of all of said shoes being so disposed as to be intersected by a plane coincident with the meeting edges of the faces of said wedge, and said friction surfaces of the shell being converged inwardly of the shell to thereby accelerate the wedge with respect to the outer series of shoes and to accelerate the inner series of shoes with respect to the wedge.

3. In a friction shock absorbing mechanism, the combination with a friction shell of rectangular cross section and provided with interior longitudinally extending friction surfaces; of a spring resistance; an outer series of four pressure-transmitting friction shoes having inwardly diverging wedge faces; an inner series of four friction shoes having outwardly diverging wedge faces, the shoes of one series being disposed in the corners of the shell and having the wedge faces thereof disposed in planes at right angles to diagonal planes passing through opposite corners of the shell, and the shoes of the other series intermediate the corner shoes and having the wedge faces thereof disposed in planes at right angles to planes normal to the walls of the shell; and a wedge having both inwardly diverging and outwardly diverging wedge faces interposed between and cooperable with said outer and inner series of said friction shoes.

4. In a friction shock absorbing mechanism, the combination with a friction shell of rectangular cross section and provided with interior longitudinally extending friction surfaces; of a spring resistance; an outer series of four pressure-transmitting friction shoes having inwardly diverging wedge faces; an inner series of four friction shoes having outwardly diverging wedge faces, the shoes of one series being disposed in the corners of the shell and the shoes of the other series intermediate the corner shoes; and a wedge having both inwardly diverging and outwardly diverging wedge faces interposed between and cooperable with said outer and inner series of said friction shoes, the co-acting wedge faces of the wedge and corner shoes being so arranged that the wedging pressure is transmitted to the corners of the shell, and the co-acting wedge faces of the wedge and the intermediate shoe being so arranged that the wedging pressure is transmitted in a direction normal to the walls of the shell, said friction surfaces of the shell being converged inwardly of the shell to thereby accelerate the wedge with respect to the outer series of shoes and to accelerate the inner series of shoes with respect to the wedge.

5. In a friction shock absorbing mechanism, the combination with a friction shell of rectangular cross section having interior friction surfaces converging inwardly of the shell; of a spring resistance; an outer series of four pressure-transmitting friction shoes having inwardly diverging wedge faces, each of said shoes being disposed in a corner of the shell and having friction surfaces cooperable with two friction surfaces of the shell at right angles to each other, an inner series of four friction shoes having outwardly diverging wedge faces and each interposed between two of the outer series of shoes and engaging with the central portion of each friction surface of the shell; and a wedge having wedge faces cooperable with the wedge faces of both the outer and inner series of shoes, the co-acting wedge faces of the wedge and shoes being so disposed that the wedging pressure is distributed substantially equally over the walls and at the corners of the shell.

In witness that I claim the foregoing I have hereunto subscribed my name this 16th day of Nov., 1921.

JOHN F. O'CONNOR.

Witnesses:
 UNA C. GRIGSBY,
 ANN BAKER.